United States Patent [19]

Pietrzak

[11] Patent Number: 4,854,556

[45] Date of Patent: Aug. 8, 1989

[54] DEVICE FOR DAMPING SHOCKS AND VIBRATIONS

[75] Inventor: Patrick Pietrzak, Saint Germain en Laye, France

[73] Assignee: Societe Anonyme dite: Intertechnique, Plaisir, France

[21] Appl. No.: 95,713

[22] Filed: Sep. 14, 1987

[30] Foreign Application Priority Data

Sep. 12, 1986 [FR] France ................................ 86 12801

[51] Int. Cl.[4] ........................ B60G 11/52; F16F 1/36; F16F 3/08; F16M 13/00
[52] U.S. Cl. ..................................... 267/33; 248/570; 264/263; 264/274; 264/279.1; 267/148; 267/152; 267/140.4
[58] Field of Search ................... 267/33, 69, 136, 140, 267/140.1, 140.4, 140.5, 148, 149, 151, 152, 166, 167, 141, 250, 257, 258, 279, 286, 287, 292, 180, 259, 160–162, 158, 165; 188/268; 180/300, 312; 248/570, 636; 264/242, 261, 263, 275, 274, 279.1; 403/220, 223, 227, 228; 428/592, 605

[56] References Cited

U.S. PATENT DOCUMENTS

| 1,671,764 | 5/1928 | Dickey .................. 267/140.4 X |
| 2,873,109 | 2/1959 | Hartenstein et al. ............. 267/141 |
| 4,573,842 | 3/1986 | Mantela et al. ................ 267/152 X |
| 4,591,030 | 5/1986 | Antkowiak ................... 267/292 X |

FOREIGN PATENT DOCUMENTS

| 0519526 | 5/1953 | Belgium ................... 267/33 |
| 0184848 | 6/1986 | European Pat. Off. ............ 267/33 |
| 7306006 | 2/1973 | Fed. Rep. of Germany . |
| 2138543 | 1/1973 | France . |
| 2451511 | 10/1980 | France . |
| 0007878 | of 1909 | United Kingdom . |
| 2043560 | 10/1980 | United Kingdom ............... 267/292 |
| 2052328 | 1/1981 | United Kingdom . |
| 2143299 | 2/1985 | United Kingdom ................. 267/33 |
| 8303647 | 10/1983 | World Int. Prop. O. .......... 267/136 |

Primary Examiner—Robert J. Oberleitner
Attorney, Agent, or Firm—Sughrue, Mion, Zinn, MacPeak & Seas

[57] ABSTRACT

The damping deive has an elastic structure consisting of one or a number of segments of wire cable and provided with fasteners for interposing the structure between two elements. The structure is enclosed within a mass of elastomeric material which adheres to the structure and has a high internal damping coefficient. The mass is traversed by at least one bore so arranged that the elastic deformations sustained by the structure cause the elastomeric material to work in compression and/or in shear.

5 Claims, 2 Drawing Sheets

DEVICE FOR DAMPING SHOCKS AND VIBRATIONS

BACKGROUND OF THE INVENTION

1. Field of the Invention

This invention relates to devices for damping shocks and vibrations of the type in which an elastic structure is formed by one or a number of wire-cable segments and in which fastening means are provided for placing the structure between two elements such as a support and a load. This structure can usefully be employed whenever it proves necessary to ensure that shocks and vibrations received by the support are not transmitted directly to the load. Noteworthy examples of application of the device include the suspension of elements of machines, of vehicles, of weapons systems and of spacecraft components supported by launchers which exhibit strong vibrations at the time of launching.

2. Description of the Prior Art

Damping devices of this type are already known. Among the omnidirectional dampers can be mentioned those which have a single segment of helically wound multiple-strand wire cable in which each turn of the helix is imprisoned in diametrically opposite zones in bars which constitute the fastening means aforesaid. Damping is obtained by frictional contact of the strands of cable. Although this construction has proved satisfactory for damping shocks, it often fails to permit a sufficient reduction of vibrations over a broad frequency spectrum such as the 20 to 500 Hz frequency spectrum encountered in launchers.

In order to ensure sufficient damping of vibrations, it is possible to add an additional external damper. However, the extra weight and bulk represented by the additional damper often prove unacceptable.

The aim of the invention is to provide a damping device of the type which has been considered in the foregoing but which satisfies practical requirements more fully than devices known up to the present time, particularly insofar as it produces a high damping force over a broad range of frequencies and makes it possible to reduce the acoustic behavior without any appreciable increase in volume occupied.

SUMMARY OF THE INVENTION

The invention accordingly proposes a damping device in which the structure of said device is embedded in an overmolded mass of elastomeric material which adheres to the structure, which has a high internal damping coefficient, and which is traversed by at least one bore formed so as to ensure that the elastic deformations sustained by the structure cause the elastomeric material to work in compression and/or in shear. Bonding of the material and of the structure can be obtained by hot-state vulcanization or polymerization on the metal which has previously been coated with an adhesive. The elastomer is advantageously a silicone-containing material of the type marketed under the trade mark RHODORSIL. The owner of the trade mark "RHODORSIL" is the company Rhô ne-Poulenc of France, "RHODORSIL" being a silicon-containing elastomer. By virtue of the association of the metallic structure and of the elastomer and on condition that at least one bore is placed in a location which ensures that the stresses within the elastomer result in deformations with dissipation of energy, there is obtained within a small volume a damping force which bears no comparison with the damping force produced by the metallic structure alone. It should be observed in passing that it would be impossible to obtain identical results by providing a simple slit instead of a bore in the mass of elastomer.

In a first embodiment of the invention, the structure is of the type in which a helical wire-cable segment is retained within bars so as to obtain omnidirectional damping. The mass of elastomer completely encloses the cable segment and the bore is formed in the axis of the turns of the cable. Other embodiments which are more simple forms of construction are adapted to damping of shocks or vibrations having a preferential direction.

DESCRIPTION OF THE PREFERRED EMBODIMENTS

Figure 1:
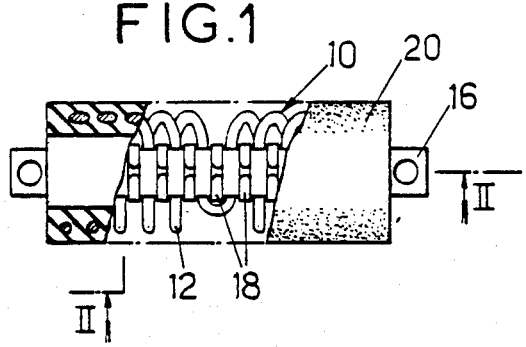
FIG. 1 is a view in elevation and partly in section showing the device in accordance with a first form of construction.
Figure 2:
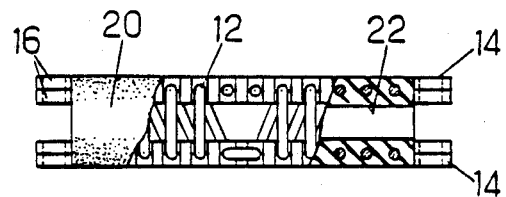
FIG. 2 is a top view of the damper, this view being taken partly in section along line II—II of FIG. 1.
Figure 3:
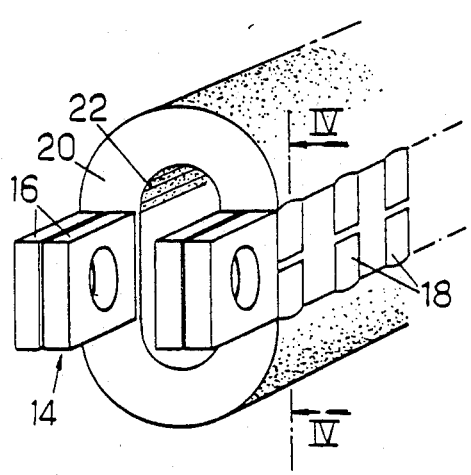
FIG. 3 is a view in perspective of the device of FIG. 1, looking on the left end of the device.
Figure 4:
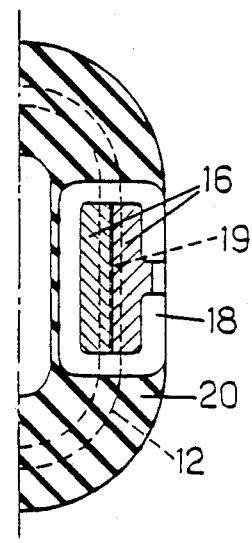
FIG. 4 is a sectional view taken along line IV—IV of FIG. 3.

The device shown in FIGS. 1 to 4 has a structure 10 which includes a spring 12 formed by a segment of multiple-strand wire cable wound in a helix, the turns of which are passed through two bars 14 in diametrically opposite zones. The bars are provided in their terminal portions beyond the ends of the segment with fastening means consisting of bores for the insertion of screws. In the embodiment which is illustrated in FIGS. 3 and 4, each bar consists of two strips 16 fastened together by means of clips 18. Semicylindrical recesses 19 formed in the opposite faces of the strips 16 constitute cylindrical passageways in which the helical turns are imprisoned.

In accordance with the invention, the structure 10 is enclosed within an overmolded mass 20 of elastomeric material having a high internal damping coefficient. The cable segment 12 is completely embedded in this mass which is pierced with an axial bore 22. The dimensions of this bore are advantageously such that the thickness of elastomeric material is of the same order of magnitude both inside and outside the turns. One satisfactory solution consists in making use of a mass located at the same level as the external portion of the clips 18. A strong additional damping effect is thus obtained without substantially increasing the occupied volume.

The elastomeric material employed in practice will usually consist of a silicone-containing elastomer which is vulcanizable in the hot state and applied on the structure under conditions such as to adhere strongly to said structure. This result can be achieved by conventional techniques of overmolding on condition that the cable segment has previously been coated with an adhesive product. Among the elastomers which are suitable for use, the material marketed under the trade mark "RHO- DORSIL" is particularly worthy of mention. Experience has shown that a device in accordance with the invention and constructed in accordance with the arrangement shown in FIGS. 1 to 4 permits satisfactory damping of vibrations over a range of 5 to 3000 Hz while remaining effective over a wide thermal range which is typically between −50° and +130° C.

Figure 5:
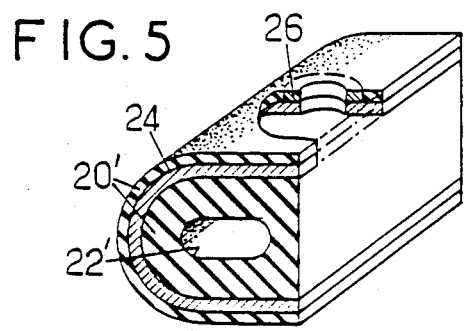
FIG. 5 is a view in perspective showing an alternative form of construction.

The simple alternative embodiment shown in FIG. 5 has a U-shaped structure in the form of a spring-steel jaw unit 24 which may be replaced by a row of cable segments. The fastening means can in this case be constituted by reinforcement plates 26 which are attached to the arms of the U by welding, for example, and pierced with bores for receiving screws. The elastomeric material 20' covers the U-shaped structure both internally and externally. Said U-shaped structure is provided with a central bore 22' which is also formed so as to allow a substantially constant thickness of elastomer to remain.

Figure 6:
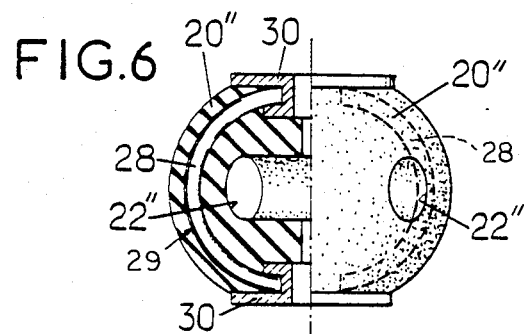
FIG. 6 is a view in elevation and in half-section showing yet another alternative form of construction.

In contrast to the embodiment of FIG. 5, the additional alternative embodiment shown in FIG. 6 is intended to ensure omnidirectional damping. In this design, the metallic structure 29 is made up of hoops 28 which may be four in number, for example, and of studs 30 for rigidly fixing the ends of the hoops. Another solution consists in winding the multiple-strand cable constituting the hoops 28 about its own axis along a plurality of meridian lines of an approximately spherical surface. The structure is also covered internally and externally with a mass of elastomer 20", bores 22" which pass between the hoops being formed in said mass.

Figure 7:
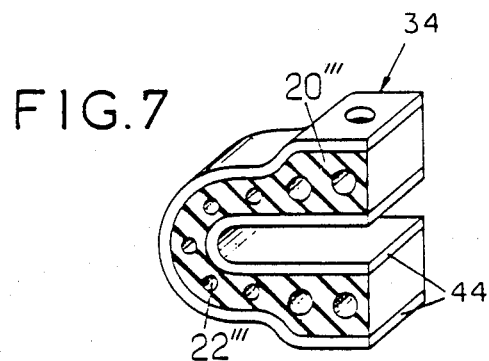
FIG. 7 is a view in perspective showing an alternative bidirectional design.

The bidirectional embodiment shown by way of alternative in FIG. 7 is composed of two jaws 44 forming a spring-steel jaw unit 34. The interior of this unit is filled with the mass 20''' of elastomeric material and its jaws 44 are coated with an adhesive product. Said unit is provided with parallel bores 22''' having a diameter such that the mean thickness of elastomer remains substantially constant. The outer jaw 44 is provided with internally-threaded fastening bores. A second mass of elastomer pierced with a central open-ended bore can occupy the interior of the inner jaw 44.

Other alternative embodiments of the invention may be contemplated and it will be understood that the scope of this patent extends to any alternative form of construction which remains within the scope and definition of equivalent means.

What is claimed is:

1. In a device for damping shocks and vibrations comprising an elastic structure formed by at least one spring, fastening means for placing this structure between two elements, the elastic structure being embedded in a mass of elastomeric material which adheres to the structure, the improvement wherein said device comprises a multidirectional damping device, the mass of elastomeric material is traversed by at least one bore and has an approximately constant internal and external thickness, and is multidirectionally free, such that the elastic deformations sustained by the structure causes the elastomeric material to work multidirectionally in at least one of compression and shear.

2. A device according to claim 1, wherein the mass is bonded to the structure by hot-state vulcanization, the spring having previously been coated with an adhesive.

3. A device according to claim 2, wherein the material of the mass is a silicone containing elastomer.

4. A device according to claim 1, wherein the elastic structure comprises a single helically-wound multiple-strand cable segment having each helical turn imprisoned in bars in diametrically opposite zones, and wherein the mass of elastomeric material completely encloses the cable segment.

5. A device according to claim 1, wherein the elastic structure comprises hoops of multiple-strand wire cable completely embedded in said mass and said mass is pierced with bores located between said hoops.

* * * * *